UNITED STATES PATENT OFFICE.

HUGO AKERHIELM, OF CHICAGO, ILLINOIS.

IMPROVEMENT IN COMPOSITIONS FOR PRESERVING WOOD.

Specification forming part of Letters Patent No. 185,058, dated December 5, 1876; application filed April 6, 1876.

*To all whom it may concern:*

Be it known that I, HUGO AKERHIELM, of the city of Chicago, Cook county, State of Illinois, have invented a new and useful Improvement in Process for Preserving Wood and Rendering it Non-Inflammable, of which the following is a full description:

The object of this invention is to treat wood which is to be used in exposed positions, so as to preserve it from decay or rotting, such as railway-ties, fence-posts, &c., and in rendering the wood by the same process non-inflammable, so that it can be used in the construction of buildings, and more particularly in constructing railway-cars, so that they will not take fire by the upsetting of stoves in them.

The nature of this invention consists in treating the wood with the solution hereinafter described, so as to fill or partly fill the open pores of the wood, and thereby prevent the absorption of oxygen in the air, water, or earth in exposed positions, and to prevent the formation of inflammable gases when the wood is exposed to a high heat.

For these purposes I make a composition as follows: Take one and a half part of protosulphate of iron, or commercial copperas; one and a half part of chloride of sodium, or salt, and dissolve in ninety-seven parts of water.

The copperas and salt may be separately dissolved in a less quantity of water, and turned into a bath.

In use, a large tank is provided, having sufficient capacity to receive the wood to be treated, and a sufficient quantity of the preparation is turned in to cover the wood to be treated, and it may be used either hot or cold, according to whether the process is desired to be rapid or slow. As the copperas, on account of its weight, is inclined to settle in case the bath is used cold, some means for mechanically stirring or agitating the water at the bottom will be used. In case of the bath being used hot, steam-pipes at the bottom will maintain a sufficient agitation to prevent the copperas from settling.

The wood should remain in the bath a sufficient length of time to become thoroughly penetrated by this solution, after which it is dried in any suitable manner, and is ready for use.

I have found by experiment that this process of treating wood not only retards decay, but renders the wood sufficiently non-inflammable to prevent its ignition, except under a very high heat for a considerable length of time, the coals from an ordinary stove not being sufficient to ignite it.

The proportions of copperas and salt given are those which are deemed the best; but they may be considerably varied and beneficial results obtained from their use, in the manner described.

What I claim as new, and desire to secure by Letters Patent, is as follows:

The herein-described composition for treating wood, consisting of a solution of copperas and salt in water, to retard decay and render it non-inflammable, substantially as specified.

HUGO AKERHIELM.

Witnesses:
 O. W. BOND,
 L. L. BOND.